US012061873B2

(12) United States Patent
Kulkarni et al.

(10) Patent No.: US 12,061,873 B2
(45) Date of Patent: Aug. 13, 2024

(54) DETERMINING LEXICAL DIFFICULTY IN TEXTUAL CONTENT

(71) Applicant: Microsoft Technology Licensing, LLC, Redmond, WA (US)

(72) Inventors: Priyanka Subhash Kulkarni, Bellevue, WA (US); Robert Rounthwaite, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 273 days.

(21) Appl. No.: 17/085,975

(22) Filed: Oct. 30, 2020

(65) Prior Publication Data

US 2022/0138422 A1     May 5, 2022

(51) Int. Cl.
*G06F 40/284* (2020.01)
*G06F 16/33* (2019.01)
(Continued)

(52) U.S. Cl.
CPC .......... *G06F 40/284* (2020.01); *G06F 16/334* (2019.01); *G06F 40/237* (2020.01);
(Continued)

(58) Field of Classification Search
CPC .... G06F 40/284; G06F 16/334; G06F 40/253; G06F 40/237; G06N 20/00; G06N 5/022
See application file for complete search history.

(56) References Cited

U.S. PATENT DOCUMENTS

| 8,239,762 B2 * | 8/2012 | Burstein | G09B 19/06 704/277 |
| 9,122,673 B2 * | 9/2015 | Alshinnawi | G06F 40/40 |

(Continued)

FOREIGN PATENT DOCUMENTS

| CN | 110135336 A | 8/2019 |
| CN | 110727796 A | 1/2020 |

(Continued)

OTHER PUBLICATIONS

Sindhwani, Gaurav, Aravindan Raghuveer, and Syama Prasad Suprasadachandranpillai, "Method and System for Enhanced Look up of Difficult Words in Text Content", 2013, https://ip.com/IPCOM/000225632, pp. 1-2. (Year: 2013).*

(Continued)

*Primary Examiner* — Richa Sonifrank
*Assistant Examiner* — James Boggs
(74) *Attorney, Agent, or Firm* — NovoTechIP International PLLC

(57) ABSTRACT

Techniques performed by a data processing system for analyzing the lexical difficulty of words of textual content include analyzing a plurality of textual content sources to determine a first frequency at which each of a plurality of first words appears, analyzing search data to determine a second frequency at which each of the plurality of first words appear in searches for a definition, generating a lexical difficulty model based on the first frequency and the second frequency, the model is configured to receive a word as an input and to output a prediction for how difficult the word is likely to be for a user, receiving a request to analyze first textual content from a client device, analyzing the first textual content using the lexical difficulty model to generate lexical difficulty information, and sending a response to the client device that includes requested information.

18 Claims, 10 Drawing Sheets

(51) Int. Cl.
  *G06F 40/237* (2020.01)
  *G06F 40/253* (2020.01)
  *G06N 20/00* (2019.01)
  *G06N 5/022* (2023.01)

(52) U.S. Cl.
  CPC ........... *G06F 40/253* (2020.01); *G06N 20/00* (2019.01); *G06N 5/022* (2013.01)

(56) References Cited

U.S. PATENT DOCUMENTS

| | | | |
|---|---|---|---|
| 10,372,228 | B2 | 8/2019 | Mao et al. |
| 10,410,539 | B2* | 9/2019 | Nielson .................... G09B 7/08 |
| 11,100,290 | B2* | 8/2021 | Boada ................... G06F 40/247 |
| 2013/0010071 | A1 | 1/2013 | Valik et al. |
| 2014/0125584 | A1 | 5/2014 | Xun et al. |
| 2016/0358275 | A1 | 12/2016 | Ikawa et al. |
| 2018/0024641 | A1 | 1/2018 | Mao et al. |
| 2019/0114300 | A1* | 4/2019 | Miltsakaki ............ G06F 40/216 |
| 2019/0324553 | A1 | 10/2019 | Liu et al. |

FOREIGN PATENT DOCUMENTS

| | | | | |
|---|---|---|---|---|
| WO | 2014127183 | A2 | 8/2014 | |
| WO | WO-2022060060 | A1 * | 3/2022 | ........... G06F 16/374 |

OTHER PUBLICATIONS

Shardlow, Matthew, Michael Cooper, and Marcos Zampieri, "CompLex: A New Corpus for Lexical Complexity Prediction from Likert Scale Data", May 2020, READI (2020), Proceedings of the 1st Workshop on Tools and Resources to Empower People with Reading Difficulties (READI), pp. 57-62. (Year: 2020).*

Pilán, Ildikó, Elena Volodina, and Richard Johansson, "Rule-based and machine learning approaches for second language sentence-level readability", Jun. 2014, Proceedings of the Ninth Workshop on Innovative Use of NLP for Building Educational Applications, pp. 174-184. (Year: 2014).*

Quijada, Maury, and Julie Medero, "HMC at SemEval-2016 Task 11: Identifying Complex Words Using Depth-limited Decision Trees", Jun. 2016, Proceedings of the 10th International Workshop on Semantic Evaluation (SemEval-2016), pp. 1034-1037. (Year: 2016).*

Strelzow, Alexej, "Language Model Driven Analysis: Simplifying text on an individual scale", Sep. 2016, Doctoral dissertation, Wien. (Year: 2016).*

Shardlow, Matthew, "A Comparison of Techniques to Automatically Identify Complex Words", Aug. 2013, Proceedings of the Association for Computational Linguistics Student Research Workshop, pp. 103-109. (Year: 2013).*

Alic, Antonio, Tomislav Lokotar, and Leonard Volaric Horvat, "SkiBaVotE: Modelling Skill-Based Voting for Complex Word Identification", Jul. 2017, Text Analysis and Retrieval 2017: Course Project Reports (TAR2017), pp. 1-5. (Year: 2017).*

Feng, Lijun, Martin Jansche, Matt Huenerfauth, and NoÃ©mie Elhadad, "A Comparison of Features for Automatic Readability Assessment", Aug. 2010, Coling 2010: Poster vol., pp. 276-284. (Year: 2010).*

"Flesch Reading Ease", Retrieved From: https://simple.wikipedia.org/wiki/Flesch_Reading_Ease, Retrieved Date: Sep. 8, 2020, 2 Pages.

"List of readability tests", Retrieved From: https://simple.wikipedia.org/wiki/List_of_readability_tests#Fog_index, Retrieved Date: Sep. 8, 2020, 5 Pages.

"Spache Readability Formula", Retrieved From: https://simple.wikipedia.org/wiki/Spache_Readability_Formula, Retrieved Date: Sep. 8, 2020, 1 Page.

"The Fry Graph Readability Formula", Retrieved From: https://readabilityformulas.com/fry-graph-readability-formula.php, Retrieved Date: Sep. 8, 2020, 3 Pages.

"The New Dale-Chall Readability Formula", Retrieved From: https://readabilityformulas.com/new-dale-chall-readability-formula.php, Retrieved Date: Sep. 8, 2020, 3 Pages.

"Word sense", Retrieved From: https://en.wikipedia.org/wiki/Word_sense, Retrieved Date: Sep. 8, 2020, 3 Pages.

Kyle, et al., "The Tool for the Automatic Analysis of Lexical Sophistication (TAALES): Version 2.0", In Journal of Behavior Research Methods, vol. 50, Issue 3, Jul. 11, 2017, pp. 1030-1046.

"International Search Report and Written Opinion Issued in PCT Application No. PCT/US21/053054", Mailed Date: Jan. 17, 2022, 11 Pages.

"MediaPipe Hands", Retrieved from: https://web.archive.org/web/20210819101919/https://google.github.io/mediapipe/solutions/hands, Aug. 19, 2021, 15 Pages.

Bao, et al., "Depth-Aware Video Frame Interpolation", In Repository of arXiv:1904.00830v1, Apr. 1, 2019, 10 Pages.

"Notice of Allowance Issued in U.S. Appl. No. 17/490,677", Mailed Date: Sep. 12, 2022, 9 Pages.

Kwolek, Bogdan, "GAN-based Data Augmentation for Visual Finger Spelling Recognition", In Proceedings of SPIE, vol. 11041, Mar. 15, 2019, 8 Pages.

"International Search Report and Written Opinion issued in PCT Application No. PCT/US22/038115", Mailed Date: Nov. 14, 2022, 11 Pages.

* cited by examiner

Whales of the World

Cetaceans are aquatic mammals that includes 89 livings species which are divided into two parvorders. The first parvorder is Odontoceti, the toothed whales, and the second parvorder is Mysticeti, the baleen whales.

In this paper, we will explore some of the differences between the baleen whales and the toothed whales. The first section will describe...

Definitions:

Parvorder: a specific taxonomic category above superfamily and below infraorder.

Baleen: a filter-feeding system inside the mouths of baleen whales, which is used to filter out krill and other food sources from the water.

FIG. 8

DETERMINING LEXICAL DIFFICULTY IN TEXTUAL CONTENT

BACKGROUND

Various means for assessing the lexical difficulty of textual content have been developed. Lexical difficulty, as used herein, refers to the difficulty level of words or phrases that are used in textual content. Many conventional techniques for assessing the lexical difficulty rely on word length, static lists of rare words, or both as the primary indicators of lexical difficulty. However, both approaches have significant shortcomings. Word length alone is often a poor indicator of lexical difficulty of a particular word. For example, the words "passengers" and "vociferate" both have a word length of ten characters. But the word "passengers" is commonly used and would be readily understood by many readers while the word "vociferate" is much less commonly used and may not be understood by many readers. Thus, word length alone is a poor indicator of the lexical difficulty of words. Furthermore, language evolves over time. Static lists of supposedly difficult words may quickly become out of date as new words are introduced to the language while other words fall out of common usage. Hence, there is a need for improved systems and methods of analyzing textual content to determine lexical difficulty of the textual content and for providing recommendations to the authors of the content, readers of the content, or both for improving the textual content.

SUMMARY

An example data processing system according to the disclosure may include a processor and a computer-readable medium storing executable instructions. The instructions cause the processor to perform operations including analyzing a plurality of textual content sources to determine a first frequency at which each of a plurality of first words appears in the plurality of textual content sources, wherein the plurality of textual content sources is obtained at least in part by automatically traversing a plurality of network-accessible content providers and collecting textual content provided by the plurality of network-accessible content providers, analyzing search data automatically collected by one or more applications, one or more search services, or both to determine a second frequency at which each of the plurality of first words appear in searches for a definition of a respective word of the plurality of first words, generating a lexical difficulty model based on the first frequency and the second frequency of the plurality of first words, wherein the lexical difficulty model is configured to receive a word as an input and to output a prediction for how difficult a word is likely to be for a user, receiving a request to analyze first textual content from a client device, analyzing the first textual content using the lexical difficulty model to generate lexical difficulty information for a plurality of second words included in the first textual content, and sending a response to the client device that includes the lexical difficulty information for the plurality of second words included in the textual content.

An example method implemented in a data processing system for analyzing the lexical difficulty of words of textual content includes analyzing a plurality of textual content sources to determine a first frequency at which each of a plurality of first words appears in the plurality of textual content sources, wherein the plurality of textual content sources is obtained at least in part by automatically traversing a plurality of network-accessible content providers and collecting textual content provided by the plurality of network-accessible content providers, analyzing search data automatically collected by one or more applications, one or more search services, or both to determine a second frequency at which each of the plurality of first words appear in searches for a definition of a respective word of the plurality of first words, generating a lexical difficulty model based on the first frequency and the second frequency of the plurality of first words, wherein the lexical difficulty model is configured to receive a word as an input and to output a prediction for how difficult a word is likely to be for a user, receiving a request to analyze first textual content from a client device, analyzing the first textual content using the lexical difficulty model to generate lexical difficulty information for a plurality of second words included in the first textual content, and sending a response to the client device that includes the lexical difficulty information for the plurality of second words included in the textual content.

An example computer-readable storage medium on which are stored instructions. The instructions when executed cause a processor of a programmable device to perform functions of analyzing a plurality of textual content sources to determine a first frequency at which each of a plurality of first words appears in the plurality of textual content sources, wherein the plurality of textual content sources is obtained at least in part by automatically traversing a plurality of network-accessible content providers and collecting textual content provided by the plurality of network-accessible content providers, analyzing search data automatically collected by one or more applications, one or more search services, or both to determine a second frequency at which each of the plurality of first words appear in searches for a definition of a respective word of the plurality of first words, generating a lexical difficulty model based on the first frequency and the second frequency of the plurality of first words, wherein the lexical difficulty model is configured to receive a word as an input and to output a prediction for how difficult a word is likely to be for a user, receiving a request to analyze first textual content from a client device, analyzing the first textual content using the lexical difficulty model to generate lexical difficulty information for a plurality of second words included in the first textual content, and sending a response to the client device that includes the lexical difficulty information for the plurality of second words included in the textual content.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 8 is an example of a user interface for presenting lexical information to a user in a second application.

DETAILED DESCRIPTION

Figure 1:
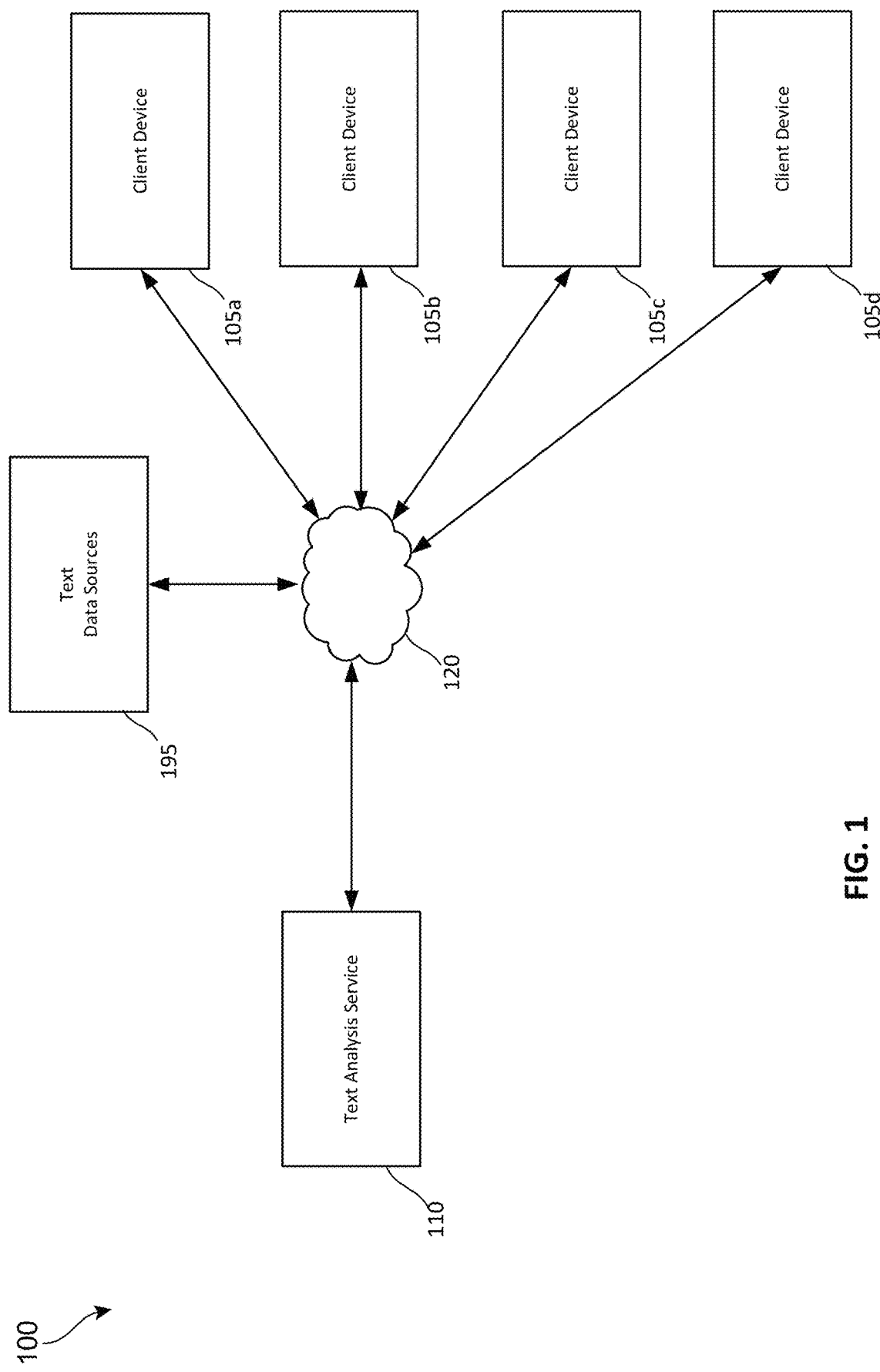
FIG. 1 is a diagram showing an example computing environment in which the techniques disclosed herein for making personalized, user-based next active time predictions for users.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for analyzing textual content to determine lexical difficulty of the textual content and for providing recommendations to the authors of the content, readers of the content, or both for improving and/or better understanding the textual content are provided. These techniques provide a technical solution for solving the technical problem of determining the lexical difficulty of words included in textual content by analyzing textual content using one or more machine learning and/or statistical models. The machine learning and/or statistical models receive a textual content of one or more words and output a prediction of the lexical difficulty of those one or more words. The machine learning models may be trained using training data generated by analyzing textual content representative of common language usage or the statistical models may be generated by analyzing the textual content representative of common language usage. The textual content may be publicly available content, such as web page content, social media content, electronic books and/or other electronic documents, and/or other electronic content that may be analyzed using the techniques disclosed herein. The textual content may also be private or semi-private content, such as documents, presentation materials, project information, social media content, emails, and/or other information associated with a particular user or organization. The private or semi-private content may be used to generate personalized machine learning and/or statistical models for the particular user or organization.

The technical benefits of these techniques include increased accuracy in predicting whether a particular word used in textual content may be a difficult word for a reader. Another technical benefit is that the reading comprehension level for a particular reader may be customized by the content author for a specific audience and/or determined based on the language abilities of the reader. The author of a textbook or other learning material may select a reading comprehension level for the target audience for the textbook, and the techniques disclosed herein can identify words used that have a lexical difficulty that is beyond the expected reading comprehension level of the target audience. The author may be presented with an alternative word or words that may be used that may be more appropriate for the target audience than a particular word identified having a lexical difficulty beyond the level appropriate for the target audience.

The techniques disclosed herein also provide technical benefits for readers of textual content. The techniques can analyze the text being read and can provide definitions to the reader for words that may exceed a lexical difficulty that the reader is expected to comprehend. The expected lexical difficulty that the reader may be expected to comprehend may be determined based on the lexical difficulty of words included in the content that the user typically reads and/or authors, the types of words and/or the lexical difficulty level of words for which the user typically searches for a definition, and/or whether the reader is part of an enterprise or other organization or has a skills that utilizes specialized language that may be lexically difficult for others who are not part of such an enterprise or organization or possess such specialized skills. Personalized lexical models may be generated for such users that take into account the expertise of the user with certain terminology. For example, a reader who is a neurosurgeon would be familiar with terminology associated with neurosurgery and may be provided a personalized lexical model that takes this expertise into account when identifying words that may be lexically difficult for the user. Furthermore, a reader associated with a particular organization or enterprise may be familiar with specific terminology utilized by an industry with which the organization or enterprise is associated. For example, a reader who works for a car manufacturer may be expected to recognize terminology specific to that industry that may be lexically difficult for someone who is not associated with that industry.

These techniques may be integrated into productivity suites, word processing programs, web browsers, online communications and collaborations platforms, email platforms, social media platforms, networking platforms, electronic document and/or book readers, and/or other platforms where a user may author and/or read textual content. The techniques disclosed herein may be implemented as a cloud-based service or locally, at least in part, on a user's computing device, such as a personal computer, mobile phone, tablet computer, electronic document reader, and/or other user device.

FIG. 1 illustrates an example computing environment 100 in which the techniques disclosed herein may be implemented. The computing environment 100 may include text analysis service 110 that may implement the techniques disclosed herein for analyzing textual content to determine lexical difficulty of the textual content and for providing recommendations to the authors of the content, readers of the content, or both for improving and/or better understanding the textual content are provided. Additional details of the implementation of the text analysis service 110 is discussed in greater detail with respect to FIG. 2. The computing environment 100 may also include text data sources 195 and client device 105a, 105b, 105c, and 105d.

The text data sources 195 may be publicly available content, such as web page content, social media content, electronic books and/or other electronic documents, and/or other electronic content that may be analyzed by the text analysis service 110 to generate one or more lexical models that may be used to analyze textual inputs and determine a lexical difficulty for words and/or phrases included in the textual inputs. The lexical models may be one or more machine learning models and/or one or more statistical models. The text analysis service 110 may be configured to generate training data that may be used to train the one or more machine learning models in implementations that use such models. The text analysis service 110 may be configured to generate the one or more statistical models, in implementations where such models are used, by analyzing the frequency of word use and/or other attributes of the words that may be indicative of lexical difficulty of the words.

The textual data sources 195 may also include private or semi-private content, such as documents, presentation materials, project information, social media content, emails, and/or other information associated with a particular user or organization. The private or semi-private content may be used to train personalized machine learning lexical models and/or to generate personalized statistical lexical models for the particular user or organization. The textual data sources 195 may also include search data collected by a search service provider and/or by applications being used by users of the client devices 105a-105d. The applications may send information to the text analysis service 110 that identifies words for which users searched for or requested a definition. The textual data sources may be analyzed to determine frequency at which words are used, a frequency at which words are searched, and other information that may be used to determine the lexical difficulty of word. Additional details regarding the analysis of the text and the factors that are used to determine the lexical difficulty are described in greater detail in the discussion of FIG. 2 that follows.

The client devices 105a-105d are computing devices that may be implemented as a portable electronic device, such as a mobile phone, a tablet computer, a laptop computer, a portable digital assistant device, a portable game console, and/or other such devices. The client devices 105a-105d may also be implemented in computing devices having other form factors, such as a vehicle onboard computing system, a video game console, a desktop computer, and/or other types of computing devices. Each of the client devices 105a-105d may have different capabilities based on the hardware and/or software configuration of the respective client device. While the example implementation illustrated in FIG. 1 includes four client devices, other implementations may include a different number of client devices.

The client devices 105a-105d may send requests for analysis of textual content to the text analysis service 110 via the network 120, and the text analysis service 110 may provide text analysis responses to the client devices 105a-105d via the network 120. The client devices 105a-105d may also request text content from the text data sources 195 via the network 120 to access the content provided by the text data sources 195, and the text data sources 195 may provide textual content to the client devices 105a-105d in response to the request for the content. The text analysis service 110 may access textual content provided by the text data sources 195, via the network 120, to analyze the text content provided by the text data sources 195 to generate training data to train one or more machine learning lexical models and/or to generate one or more statistical lexical models. The lexical models may be used by the text analysis service 110 to receive textual content as an input and to output a prediction of a lexical difficulty of words included in the textual input.

Figure 2:
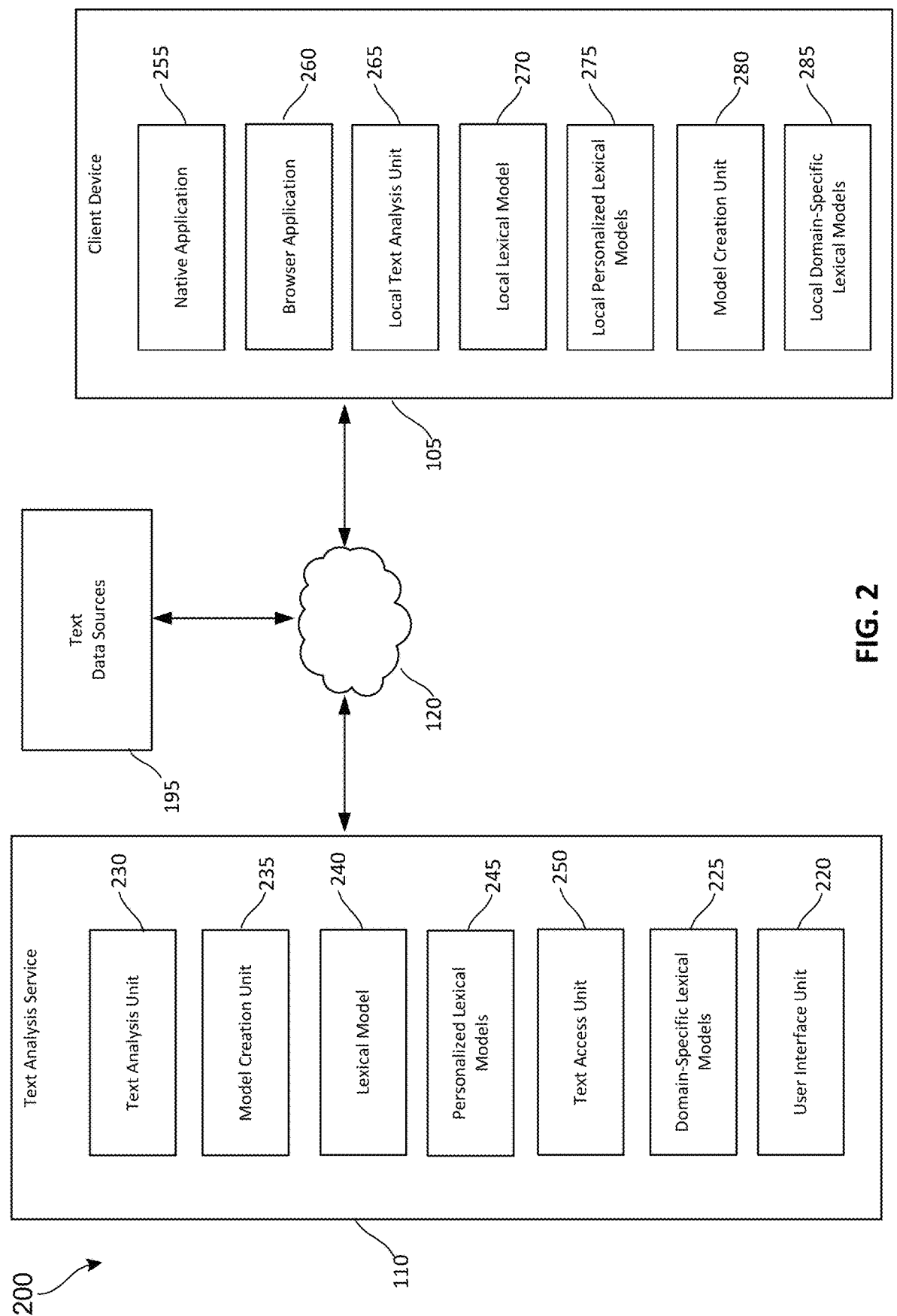
FIG. 2 is a diagram illustrating additional details of the calendar services computing environment shown in FIG. 1.

FIG. 2 shows another view of the computing environment 200 that shows additional elements of the text analysis service 110 and a client device 105. The text analysis service 110 may include a user interface unit 220, a text analysis unit 230, a model creation unit 235, a lexical model 240, personalized lexical models 245, domain-specific lexical models 225, and text access unit 250. The client device 105 may include a native application 255, a browser application 260, a local text analysis unit 265, a local lexical model 270, and a local personalized lexical model 275.

The text analysis unit 230 may be configured to analyze textual content to determine the lexical difficulty of the words used in the textual content. The text analysis unit 230 may be configured to analyze the textual content using one or more machine learning models and/or statistical models, such as the lexical model 240, the personalized lexical models 245, and/or the domain-specific lexical models 225. The text analysis unit 230 may be configured to analyze a plurality of textual content sources to generate data that may be used to train the machine learning models.

The text analysis service 110 may receive requests to analyze the textual content from client devices, such as the client device 105. The requests from the client devices may originate from the native application 255 or the browser application 260. As will be discussed in greater detail in the examples that follow, the native application 255 may be an application that allows a user to view, author, and/or modify textual content. The native application may also include user interface elements that may proactively and/or reactively present the user with information for lexically difficult words identified by the models. The browser application 260 may also be configured to present the user with the information for lexically difficult words within a cloud-based application, web page content, and/or other content being accessed via the web browser. Examples of the user interfaces elements that may be displayed on the client device 105 are described in greater detail in the examples which follow.

To train the machine learning models and/or to generate the one or more statical models, the text analysis unit 230 may first analyze textual content provided by the data sources 195 to determine the lexical difficulty of words used in the lexical content. This data may then be used to train one or more machine learning models and/or to generate one or more statistical models that may be used to implement the lexical model 240, the personalized lexical models 245, and/or the domain-specific lexical models 225 to predict the lexical difficult of words encountered in textual content being read and/or authored by a user.

The text analysis service 110 may be configured to systematically browse through the content provided by the data sources 195 to collect textual content to be analyzed. The text analysis service 110 may use a web crawler, which is an automated process that is configured to traverse the content in websites and/or other network-accessible content and analyze the textual content encountered. In some implementations, the web crawler may make a copy of the textual content as the online content is traversed by the crawler. In other implementations, the web crawler may analyze the textual content on the fly as the content is accessed by the web crawler. The web crawler may determine word frequency counts and word feature information for the textual content. The textual content may then be collated with totals from other textual content that has already been analyzed to output the data used by the equations for determining the lexical difficulty of words discussed in the examples that follow.

The text analysis unit 230 may determine the lexical difficulty of words using a search-to-seen ratio (SSR) which leverages crowdsourced data to estimate the lexical difficulty of the words used in the plurality of textual content sources. The SSR may be calculated for all or a subset of the words included in the textual content from a plurality of data sources. The text analysis unit 230 may be configured to calculate the SSR for a word w using the following equation:

$$SSR_w = \frac{N_s}{N_u} \quad (1)$$

where the numerator $N_s$ represents a count of the number of times that users have searched for the word w or requested a definition of the word, and the denominator $N_u$ represents a number of times that the word w is seen in the universe of textual content that has been analyzed by the text analysis unit 230. The universe of content may include the public, private, and/or semi-private content provided by the text data sources 195. The search data used to calculate the number of times that users have searched for a particular word may be collected from various data sources, such as search engines, from search features included in a native application and/or in a cloud-based application, by counting a number of times that a page for the word has been accessed in an online dictionary, and/or from other data sources that may provide an indication that a user has searched for or accessed a definition of a particular word.

The lexical difficulty of a word may be determined based on other features in addition to the SSR. In some implementations, the text analysis unit 230 may be configured to use one or more of the following features in addition to the SSR to determine the lexical difficulty of the word. One feature that may be used to determine the lexical difficulty of a word is the part of speech of the word. The part of speech of a word refers to a category to which the word is assigned in accordance with the word's syntactic function. Analysis of search data has indicated that users tend to search for the meaning of adjectives more frequently than the meaning of nouns. Thus, adjectives may be assigned a higher lexical difficulty than nouns. While this example discusses differences between the lexical difficulty between adjectives and nouns, the lexical difficulty determination is not limited to these two parts of speech. Other parts of speech may be associated with a lexical difficulty.

The non-vowel length of the word is another feature that may be used to determine the lexical difficulty of the word. The non-vowel length of the word is the number of consonants of the word. Words that have more vowels tend to be easier for many people than words of a similar length that have more consonants.

The number of syllables of the word is another feature that may be used to determine the lexical difficulty of the word. Words having more syllables may be more difficult for people to understand, and thus may be assigned a higher lexical difficulty. In contrast, words having fewer syllables may be assigned a lower lexical difficulty.

The number of word senses associated with a word is another feature that may be used to determine the lexical difficulty of the word. A "word sense" as used herein refers to a meaning of a word. Some words have multiple meanings. For example, the word "bank" may be used to refer to: (1) a financial institution, (2) a riverbank, or (3) to depend on something. The words associated with more word senses may be assigned a higher lexical difficulty than words associated with fewer word senses.

The lexical difficulty may be calculated using a weighted average of the various factors described above using the following equation:

$$LD_w = \frac{W_{SSR}(SSR_w) + W_{PS}(PS_w) + W_{NVL}(NVL_w) + W_{SyC}(SyC_w) + W_{SeC}(SeC_w)}{W_{SSR} + W_{PS} + W_{NVL} + W_{SyC} + W_{SeC}} \quad (2)$$

wherein the $LD_w$ represents the lexical difficulty of word w based on the features discussed above, wherein $SSR_w$ represents the SSR value determined using equation 1 and $W_{SSR}$ represents the weight associated with the SSR value, wherein $PS_w$ represents the value associated with the part of speech of the word and $W_{PS}$ represents the weight associated with the part of speech value, wherein represents non-vowel length of the word w and $W_{NVL}$ represents the weight associated with the non-vowel length value, and $SyC_w$ represents the number of syllables of the word w and $W_{SyC}$ represents the weight associated with the number of syllables value, and wherein $SeC_w$ represents the number of word senses of the word w and $W_{SeC}$ represents the weight associated with the number of syllables value. While equation (2) includes all the example features discussed above for calculating the lexical weight of a word, implementations of the text analysis unit 230 may include a subset of these features when determining the lexical difficulty of a word. Some implementations may include additional features that are not mentioned in this example. Furthermore, different implementations of the text analysis unit 230 may assign different weights to each of the features based on the relative importance of those features in determining the lexical difficulty of the word according to the model being developed.

The text analysis unit 230 may analyze a large quantity of data from the text data sources 195 to generate a set of lexical difficulty data that may be used to generate lexical models. The lexical models may be one or more machine learning models and/or one or more statistical models. The text analysis unit 230 may generate training data for the one or more machine learning models based on the lexical difficulty data. The lexical models may be used to implement the lexical model 240, personalized lexical models 245, and the domain-specific lexical models 225. Each of the lexical models may be configured to receive textual content as an input and to output a prediction of a lexical difficulty of words included in the textual input. The personalized lexical models 245 are machine learning models that are personalized for a particular user or group of users. The personalized lexical models 245 may be trained to predict how difficult a particular user or group of users may find words in a textual input. The domain-specific lexical models 225 are models that are personalized for a particular domain. A domain, as used herein, may refer to a specified sphere of activity or knowledge. Examples of domains include but are not limited to marine biology, aerospace engineering, artificial intelligence, geography, fashion, and food science. A domain-specific lexical model may include a vocabulary and/or phrases that may be commonly used by users who have knowledge of a particular domain. Domain-specific vocabulary may be difficult for users who are not associated with that domain but not for users that are associated with that domain. In contrast, the lexical model 240 is a machine learning model or statistical model that is not personalized for a particular user or group of users and instead may be generated based on all the data analyzed by the text analysis unit 230. The lexical model 240 may be used to represent an average user and to provide predictions as to how difficult such an average user would find words included in a textual input.

The personalized lexical models 245 may be generated by further training a copy of the lexical model 240 using data specific to a particular user or group of users for whom a personalized lexical model 245 is intended. A personalized lexical model may also be developed for a particular user. The personalized lexical model may be developed based on the search data obtained from the native application 255 or the browser application 260 of the computing device 105 of the user. The personalized lexical model may also be developed based on the words encountered in the content that the user reads and/or authors. Furthermore, the personalized lexical model may be developed based on whether the user selects recommendations provided for words that were predicted to be lexically difficult for the user. If the user does access the recommendations for a particular word, then the model may be updated to indicate that the user did not find the word to be lexically difficult. The text analysis unit 230 may be configured to generate training data for the personalized lexical model 245 based on this activity information collected for the user to fine tune the performance of the personalized lexical model 245 for the user.

The domain-specific lexical models 225 may be generated for a person or group of people having a specific skillset or who are part of a particular field that utilizes terminology that is common knowledge for those whom have that skillset or are part of that particular field. For example, biologists may encounter a set of vocabulary in documents that they read and/or author that are specific to the domain of biology. People within the field may readily understand this terminology while others outside of the field may find such vocabulary to be lexically difficult. A domain-specific lexical model 225 is trained or configured to recognize that such domain-specific terminology is not likely to lexically difficult for a user who has knowledge of that particular domain, which may be in direct contrast with the lexical model 240 which is trained to predict that an average user would find such terminology lexically difficult.

The domain-specific lexical models 225 may be generated by further training a copy of the lexical model 240 using domain-specific information and/or by generating one or more statistical models of word usage of textual content associated with specific domains. The text analysis unit 340 may be configured to analyze the textual content provided by the data sources 195 using one or more models configured to identify a subject matter of the textual content. The domain-specific lexical models 225 may include vocabulary and/or phrases that may be commonly used by users who have knowledge of a particular domain but may be lexically difficult for users who are not familiar with the subject matter associated with the domain. The subject matter may then be associated with a specific domain. For example, the text analysis unit 340 may analyze a journal article on deep learning and determine that the subject matter is machine learning related. As a result, the journal article may be analyzed for word usage and that word usage information may be used to update a domain-specific model. The text analysis unit 340 may generate many domain-specific lexical models 225 as the textual content provided by the data sources 195 is analyzed. Furthermore, a user may have knowledge across multiple domains. As such, a user may be associated with more than one domain-specific lexical model 225.

The text analysis unit 230 may be configured to determine that a user has domain-specific knowledge based on documents that the user has previously viewed, edited, or authored, such as web page content, social media content, electronic books and/or other electronic documents. The text analysis unit 230 may also determine domain knowledge based on searches for definitions for words conducted by the user. For example, if the user conducts searches for terms related to artificial intelligence, the text analysis unit 230 may determine that the user is associated with that particular domain. The text analysis unit 230 may maintain a mapping of domains to users who have knowledge of a particular domain. For example, the text analysis unit 230 may maintain a user domain knowledge database that may be used to determine whether a user is associated with a personalized lexical model 245 and/or one or more domain-specific lexical models 225. This mapping may then be used to select an appropriate lexical model or lexical models for analyzing textual content and for providing suggestions to the user.

The text analysis unit 230 may be configured to apply the lexical difficulty models to provide various services to users. The text analysis unit 230 may be configured to receive a request to analyze the text content from the native application 255 or the browser application 260 of the computing device 105. The request may include textual content to be analyzed. The textual content may be from an electronic document, presentation, email, text message, web page, or other textual content being read and/or authored by a user of the client device 105. The text analysis unit 230 may analyze the textual content and analyze the lexical difficulty of the words included in the textual content. The text analysis unit 230 may be configured to analyze the textual content using the lexical model 240, the personalized lexical models 245, or the domain-specific lexical models 225. The request may include an indication whether a personalized lexical model 245 or domain-specific lexical model 225 should be used. Otherwise, the text analysis unit 230 may be configured to analyze the textual input using the text analysis unit 230.

The selected model may output a prediction of the lexical difficulty of the words included in the textual input. The text analysis unit 230 may send a response to the computing device 105 that includes lexical difficulty ratings for at least a portion of the words included in the textual content that was analyzed by the text analysis unit 230. The response may include a list of words that were analyzed by the text analysis unit 230 and a lexical difficulty score for each of the words included in the list. The list may include all the words from the textual content or a subset of the words from the textual content. The text analysis unit 230 may not include words that have a lexical difficulty score below a predetermined threshold or may not include words from a list of common words. The text analysis unit 230 may also include a definition for at least a subset of the words included in the list with the response provided to the client device 105. In some implementations, the text analysis unit 230 may automatically lookup a definition for words having a lexical difficulty score that is higher than a threshold value.

The user interface unit 220 may be configured to provide and/or control the display of user interface elements associated with the lexical difficulty ratings determined by the text analysis unit 230. The native application 255 and/or the browser application 260 may be configured to proactively and/or reactively display user interface elements that may assist users with lexically difficult words. The text analysis unit 230 may be configured to estimate the needs of the user and to trigger the display of user interface elements by the native application 255 and/or the browser application 260 of the client device 105.

The native application 255 and/or the browser application 260 may be configured to receive the response from the text analysis unit 230 that includes the lexical difficulty ratings information from the text analysis unit 230 and make a determination whether to proactively and/or reactively display user interface elements that may assist the user with lexically difficult words. The native application 255 or the browser application 260 may present to the user an indication that certain words from the textual content being read and/or authored by the user have been identified as lexically difficult words. Words that have been identified as being potentially difficult for the user may be highlighted, underlined, and/or some other indication may be rendered over or proximate to the word to indicate that the word may be lexically difficulty for the user. Furthermore, the native application 255 or the browser application 260 may provide a means for causing the native application 255 or the browser application 260 to provide additional information for the words that have been identified. For example, the user may click on, hover over the word with a pointer, touch the word on a touchscreen interface, or otherwise interact with the word to cause the native application 255 or the browser application 260 to display a definition and/or other information that may increase the user's understanding of the word.

Figure 7:
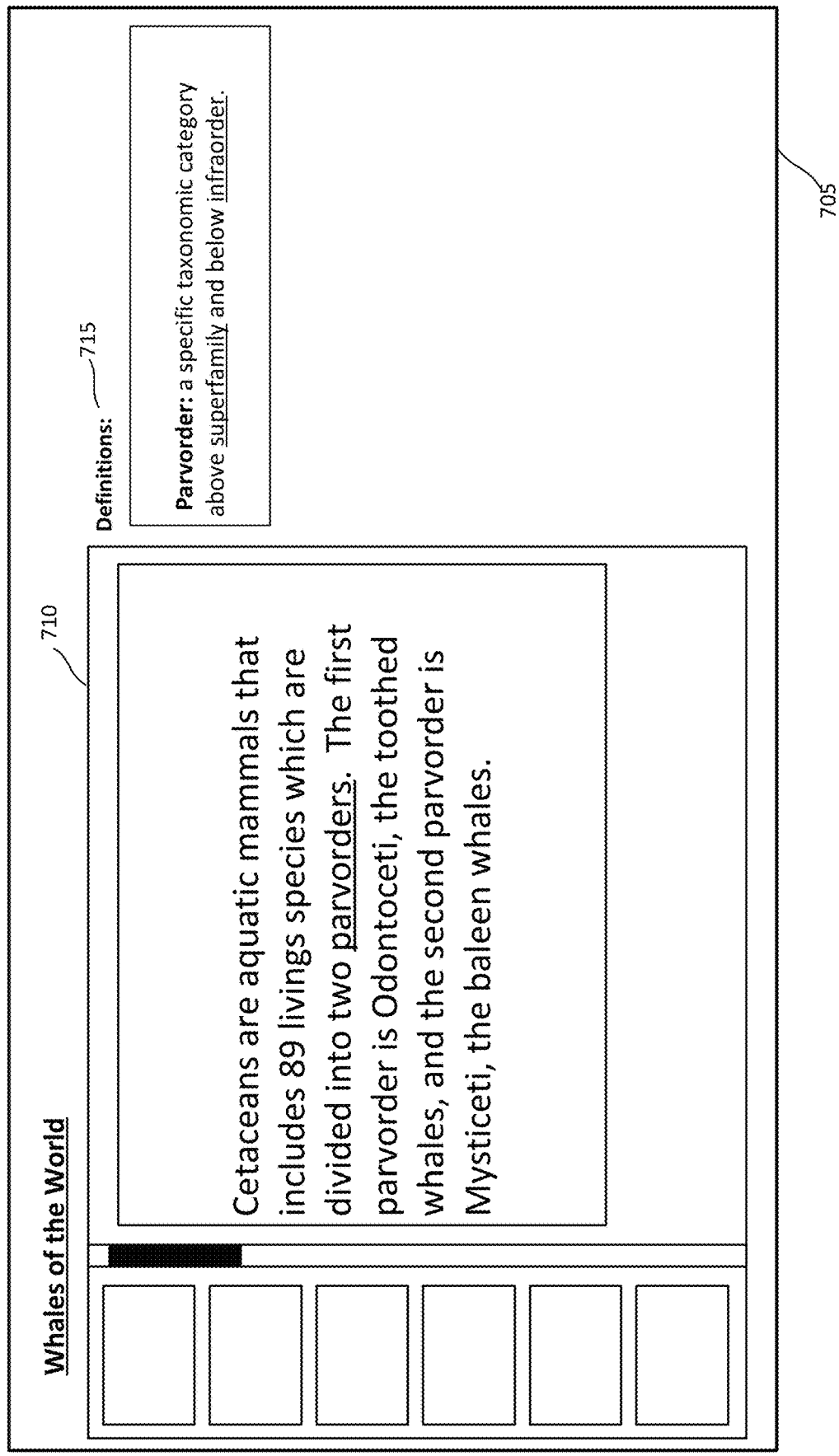
FIG. 7 is an example of a user interface for presenting lexical information to a user in a first application.

FIGS. 7, 8, 9A and 9B show some examples of user interface elements that may be presented to the user to help the improve their understanding of lexically difficult words. FIG. 7 shows an example user interface 705 of a presentation application, such as but not limited to Microsoft PowerPoint. The application may be implemented as a native application on the client device 105, such as the native application 255, or may be implemented as a cloud-based application that is accessed via a web browser, such as the browser application 260. The user interface 705 includes a content pane 710 that displays the contents of the presentation. In this example, the user is reading the contents of the presentation. However, the user interface 705 may also permit the user to create a new presentation and/or to modify an existing presentation. The presentation shown in the content pane 710 includes textual content. The textual content may be sent to the text analysis service 110 for analysis and text analysis unit 230 of the text analysis service 110 may provide lexical difficulty ratings information in response to receiving the textual content. In some implementations, the textual content of an entire electronic document may be sent to the text analysis service 110 for analysis. In other implementations, textual content for a portion of the electronic document may be sent to the text analysis service 110 for analysis. For example, the textual content of a portion of the electronic document visible in a content pane, such as the content pane 710, may be sent to the text analysis service 110 for analysis. This approach provides the technical benefit of reducing network traffic and utilization of processing resources of the text analysis service 110 by only sending a portion of the textual content of an electronic document for analysis that the user is actually reading, authoring, or modifying.

In the example shown in FIG. 7, the word "parvorders" has been identified as being lexically difficult. In this example, the user interface has taken a couple of proactive steps to assist the user. The word "parvorder" has been underlined in the textual content shown in the content pane 710. As indicated above, words that have been identified as being potentially difficult for the user may be highlighted, underlined, and/or some other indication may be rendered over or proximate to the word to indicate that the word may be lexically difficulty for the user. The highlighting, underlining, and/or other indication may be color coded or be rendered with a specific pattern that enables the user to distinguish the indication from spelling error notifications, grammar error notifications, and/or other notifications that may be presented to the user. In addition to the underlining, a definitions pane 715 has been displayed that includes a definition of the word "parvorder" that was also highlighted in the text. The definition was automatically displayed in the definitions pane 715 in this example. However, in other implementations, the definition pane 715 may be displayed in response to the user clicking on or otherwise interacting with the underlined word "parvorder" in the textual content of the content pane 710. The definitions pane 715 may be displayed in response to the user moving a cursor position to the highlighted word, moving a mouse pointer over the highlighted word, or clicking on the highlighted word. The example shown in FIG. 7 includes only a single word that has been identified as lexically difficult, but the user interface 705 may display multiple highlighted words and definitions where more than one word has been identified as lexically difficult.

FIG. 8 shows an example user interface 805 of a word processing application, such as but not limited to Microsoft Word. In the example shown in FIG. 8, the user is drafting an electronic document that includes textual content in the content pane 810. In this example, the user is authoring or editing a document in the content pane 810, and at least a portion of the textual content of the document has been sent to the text analysis service 110 for analysis, and the results identified two possibly lexically difficult words in the text that the user is drafting in the content pane 810. In this particular example, the words "parvorders" and "baleen" have been identified as lexically difficult words. Instances of both words in the textual content have been underlined and the definitions of both words have been included in the definitions pane 815. The lexical difficulty may be based on analysis of the textual content of the lexical model 240, which represent a general lexical model that is not personalized or domain specific. The lexical model 240 may identify these words as being lexically difficult to the user authoring or editing the document and/or to the audience who may be reading the document. If the user in this example was associated with a personalized lexical model 245 or a domain-specific lexical model 225 that indicated that these words are not lexically difficult, then the text analysis service 110 may have not identified one or both of these words as being lexically difficult if either of these models indicated that they should not be lexically difficult for the user. In some implementations, the text analysis unit 230 may determine an intended audience for content being authored or modified and may analyze the lexical difficulty of the textual content using a model appropriate to the audience. An indication that certain words may be lexically difficult for the intended audience may be provided instead of or in addition to the lexical difficulty ratings with respect to the user authoring or editing the textual content.

Figure 9A:
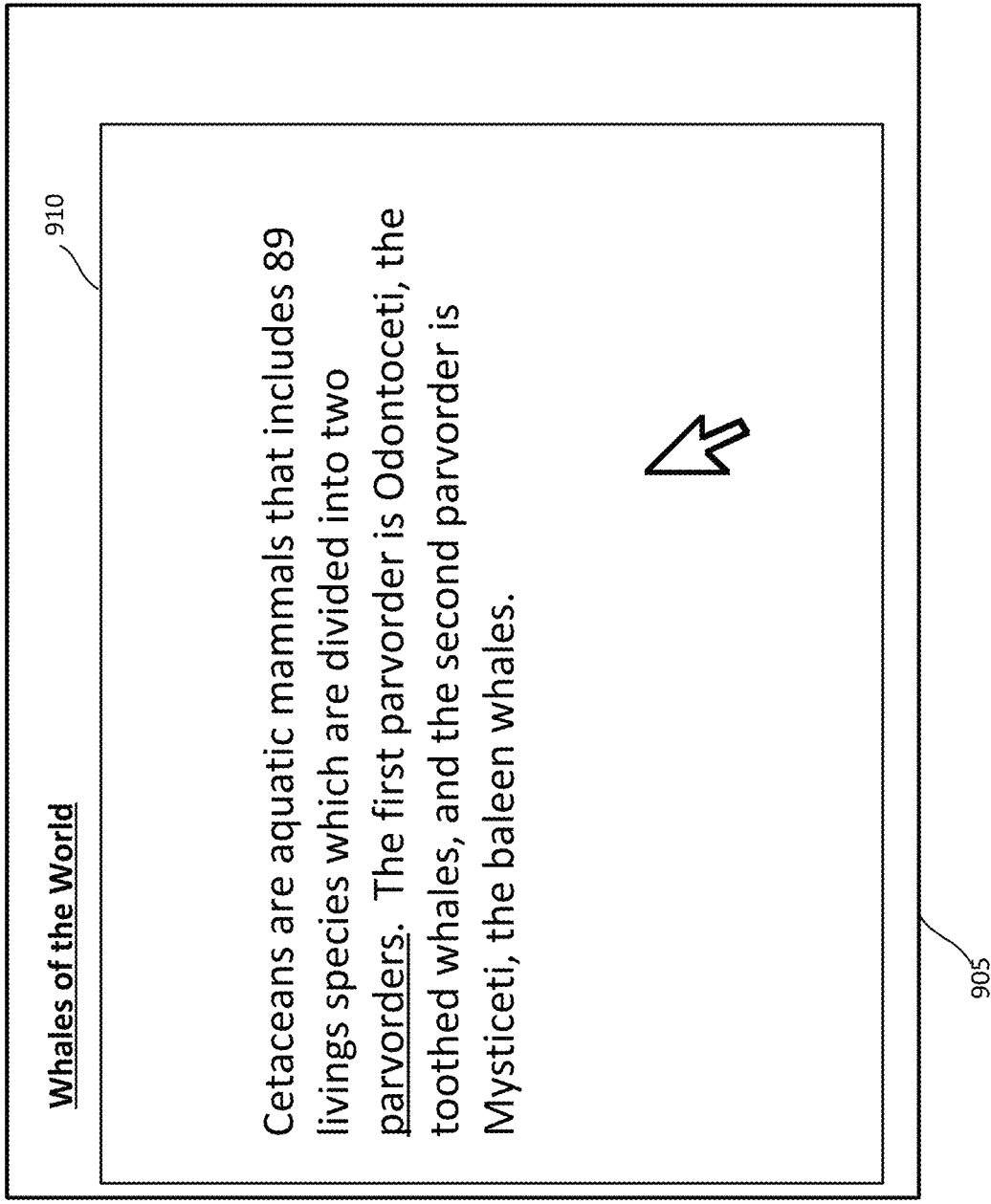
FIGS. 9A and 9B are examples of a user interface for presenting lexical information to a user in a third application.
Figure 9B:
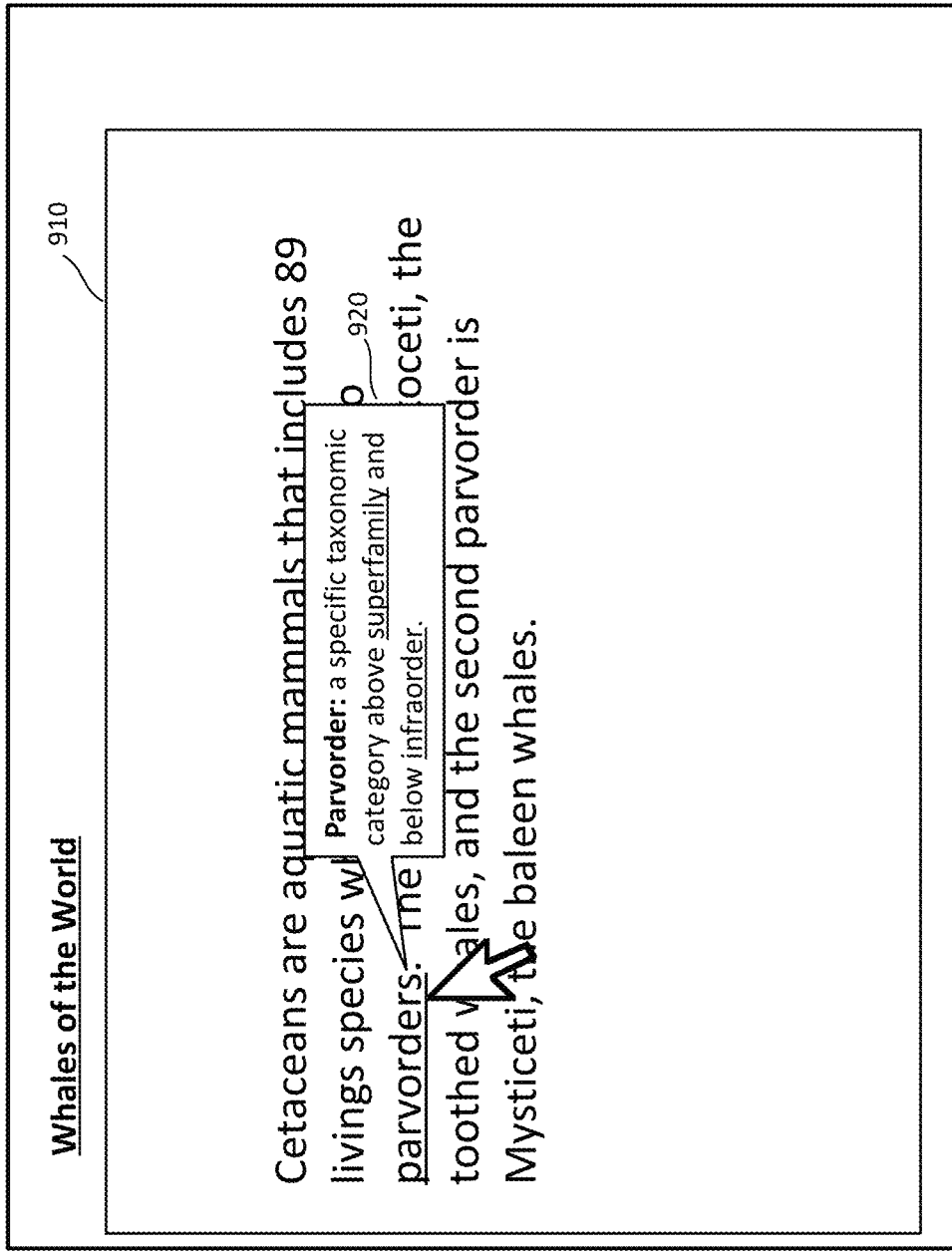

FIGS. 9A and 9B show an example user interface 905 that may be used in some implementations. The user interface 905 includes a content pane 910 in which content may be displayed. The user may be reading, authoring, and/or modifying the textual content shown in the content pane. The user interface 905 does not include the definitions panes included in user interfaces 705 and 805. Instead, lexically difficult words may be underlined or otherwise highlighted as indicated in FIG. 9A, and the user may move a cursor or mouse pointer over the word as shown in FIG. 9B to cause the user interface to display the popup 920 that displays a definition of the word.

Returning to FIG. 2, in some implementations, the request to the text analysis unit 230 to analyze the text content from the native application 255 or the browser application 260 of the computing device 105 may include one or more of the following: (1) user identification information, (2) user language proficiency information, or (3) audience language proficiency information. The user identification information may include a unique user identifier for a particular user or group of users that may be used to determine that the user is associated with a personalized lexical model 245 or a domain-specific lexical model 225. The text analysis unit 230 can use the user identification information to determine which lexical model should be used to analyze the textual content for the user. For example, if the user is indicated to be an engineer for an aerospace corporation, a lexical model that includes technical terms and/or acronyms used by the aerospace industry may be selected. This lexical model may be a domain-specific lexical model associated with the aerospace industry or a personalized lexical model associated with the user.

The user language proficiency information may be used to indicate that that the user has a certain level of language proficiency in English or another language for which the textual content is to be analyzed. The language proficiency level may be used to select a personalized lexical model 245 that has been trained to predict that someone having that level of language proficiency would be expected to find certain words to be lexically difficult while other words may not be lexically difficult for someone having that level of language proficiency. A set of lexical models may be trained for multiple levels of language proficiency. These models could be used to predict the lexical difficulty of certain words for someone learning a language and the model selected may change as the language proficiency of the user improves over time. Furthermore, each successive model may be used to suggest words to the user that have a higher level of lexical difficulty. For example, the model may provide synonyms for words that have a higher level of lexical difficulty to the user as the user's language skills improve. These suggestions may be provided to the user by highlighting words in the textual content and providing suggestions for words that might be used instead of a highlighted word.

The audience language proficiency information may be included in the request to indicate the language proficiency level of an intended audience for content being authored by the user. For example, a user may be authoring a textbook or other instructional material for students. The user may be authoring the content in a native application 255 or using a cloud-based application in the browser application 260 of the client device 105. The application may recognize that the user is authoring content and may present the user with a user interface that allows the user to provide information about the intended audience for the user. The audience information may be provided to the text analysis service 110 and this information may be used to identify an appropriate lexical learning model from the personalized lexical models 245 for the intended audience. The lexical model may predict that certain words may be too difficult for the intended audience and may suggest alternative words to the user that may be more appropriate for the reading proficiency of the intended audience.

The model creation unit 235 is configured to generate the lexical model 240, the personalized lexical models 245, and the domain-specific lexical models 225 using training data generated by the text analysis unit 230 as discussed above. The model creation unit 235 may be configured to update the personalized lexical models 245 periodically based on the user-specific information collected for the user for whom the personalized lexical models 245 are intended. The model creation unit 235 may be configured to update the domain-specific lexical models 225 based on domain-specific information. The domain-specific lexical models 225 may be updated periodically to reflect changes in the language usage patterns and for the emergence of new vocabulary of a particular domain. The lexical model 240 may also be updated periodically to reflect changes in language usage patterns and to account for the emergence of new vocabulary and the reduction in usage of other vocabulary. The text analysis unit 230 may be configured to periodically analyze the content provided by the text data sources and to generate updated training data for the lexical model 240. In some implementations, changes in usage patterns of words may be identified, and training data dedicated to these changes may be generated and used to update the training of the model. In other implementations, a new instance of the personalized lexical model 245 may be trained and used to replace the existing instance of the personalized lexical model 245 and/or a new instance of the domain-specific lexical model 225 may be trained and used to replace the existing instance of the domain-specific lexical model 225.

The text access unit 250 may be configured to access textual content from the text data sources 195 via the network 120. The text access unit 250 may be configured to automatically access textual content from the text data sources 195 periodically and to provide the content to the text analysis unit 230 for analysis. The text access unit 250 may be configured to receive configuration information that allows an administrator to specify a Universal Resource Locator (URL), network address, or other identifier for a network-accessible resource that includes the textual content to be accessed. The text access unit 250 may be configured to run at specific times specified by the administrator. The text access unit 250 may also provide a user interface that allows an administrator to select which data sources of the text data sources 195 should be accessed to create training data for the lexical models.

With respect to the client device 105, the client device 105 may include a native application 255. The native application 255 is an application developed for use on the client device 105. The native application may be part of a productivity suite, a word processing application, part of an online communications and collaborations platform, part of an email platform, a social media application, an application for a networking platform, an electronic document and/or book reader, and/or other platforms where a user may author and/or read textual content. In some implementations, the native application 255 may be configured to request that the local text analysis unit 265 analyze the textual content being accessed and/or authored via the native application 255. In other implementations, the native application 255 may send requests to the text analysis service 110 for analysis and the text analysis service 110 may provide text analysis results that provide lexical difficulty information for the contents of the textual content sent to the text analysis service 110 for analysis.

The browser application 260 may be a web browser application for accessing content from the Internet. The browser application may implement at least a portion of the techniques for analyzing textual content to determine lexical difficulty of the textual content and for providing recommendations to the authors of the content, readers of the content, or both for improving and/or better understanding the textual content. In some implementations, the browser application 260 may be configured to request that the local text analysis unit 265 analyze the textual content being accessed and/or authored via the browser application 260 using local lexical model 270, the local personalized lexical model 275, and/or the local domain-specific lexical models 285. In other implementations, the browser application 260 may send requests to the text analysis service 110 for analysis and the text analysis service 110 may provide text analysis results that provide lexical difficulty information for the contents of the textual content sent to the text analysis service 110 for analysis.

The local text analysis unit 265 may be configured to provide functionality similar to the text analysis service 110 locally on the client device 105. In some implementations, the client device 105 may utilize the local text analysis unit 265 rather than the text analysis service 110 for obtaining lexical analysis of text content. The native application 255 and/or the browser application 260 may be configured to utilize the local text analysis unit 265. The local text analysis unit 265 may analyze textual content with the lexical model 270, the personalized model 275, or a local domain-specific lexical model 285.

The lexical model 270 may be a machine learning model or statistical model similar to lexical model 240 of the text analysis service 110. In some implementations, the lexical model 270 may be obtained from the text analysis service 110. In other implementations, the lexical model 270 may be installed on the client device 105 with the native application 255 and/or the browser application 260.

The local personalized lexical model 275 may be machine learning models and/or statistical models similar to the personalized lexical models 245 of the text analysis service 110. In some implementations, the local personalized lexical model 275 may be obtained from the text analysis service 110. In other implementations, the local personalized lexical model 275 may be installed on the client device 105 with the native application 255 and/or the browser application 260. In yet other implementations, the model creation unit 280 may generate the personalized lexical model 275 based on the lexical model 270.

The local domain-specific lexical models 285 may be machine learning models and/or statistical models similar to the domain-specific lexical models 225 of the text analysis service 110. In some implementations, the local domain-specific lexical models 285 may be obtained from the text analysis service 110. In other implementations, the local domain-specific lexical models 285 may be installed on the client device 105 with the native application 255 and/or the browser application 260. In yet other implementations, the model creation unit 280 may generate the local domain-specific lexical models 285 based on the lexical model 270.

The model creation unit 280 of the client device 105 can be used to generate the personalized lexical models 275 on the client device. The model creation unit 280 of the client device may be configured to operate similarly to the model creation unit 235 of the text analysis service 110. The model creation unit 280 of the client device 105 may be configured to update the local personalized lexical models 275 periodically based on the user-specific information collected for the user for whom the personalized lexical models 245 are intended. The local domain-specific lexical models 285 may be updated periodically to reflect changes in the language usage patterns and for the emergence of new vocabulary of a particular domain. The local lexical model 270 may also be updated periodically to reflect changes in language usage patterns and to account for the emergence of new vocabulary and the reduction in usage of other vocabulary. In some implementations, the updated local lexical model 270, the local personalized lexical models 275, and/or the local domain-specific lexical models 285 may be obtained from the text analysis service 110 instead of being generated or updated by the model creation unit 280.

Figure 3:
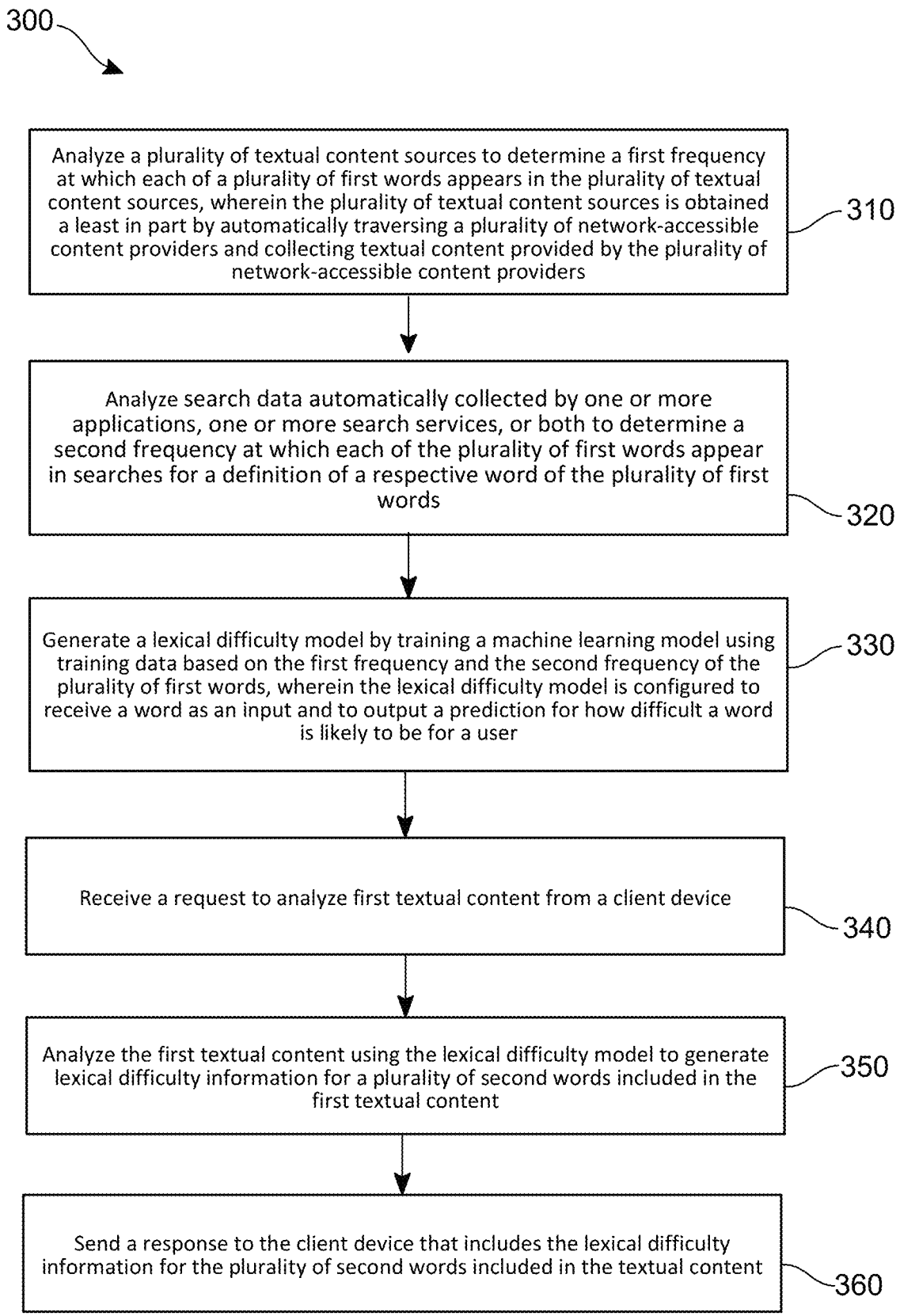
FIG. 3 is a flow chart of an example process for analyzing the lexical difficulty of words of textual content.

FIG. 3 is a flow chart of an example process 300 for analyzing the lexical difficulty of words of textual content. The process 300 may be implemented by the text analysis service 110.

The process 300 may include an operation 310 of analyzing plurality of textual content sources to determine a first frequency at which each of a plurality of first words appears in the plurality of textual content sources. The first frequency may represent a number of times ($N_u$) that a word w is seen in the universe of textual content that has been analyzed by the text analysis unit 230 as discussed with respect to equation (1).

The text analysis unit 230 of the text analysis service 110 may obtain plurality of textual content sources from the text data sources 195. The plurality of textual content sources may be obtained a least in part by automatically traversing a plurality of network-accessible content providers and collecting textual content provided by the plurality of network-accessible content providers. For example, a web crawler may automatically traverse a plurality of websites to collect textual content provided by these sites. The text data sources 195 may include publicly available content, such as web page content, social media content, electronic books, and/or other electronic documents, and/or other electronic content that may be analyzed by the text analysis service 110. The frequency of the words that appear in the crowd-sourced content provided by the text data sources 195 may be indicative of the lexical difficult of the word. Words that are used frequently are more likely to be recognized by users and may be determined to be less lexically difficulty. In contrast, words that are used infrequently may be less likely to be recognized by users and may be determined to be more lexically difficult.

The process 300 may include an operation 320 of analyzing search data automatically collected by one or more applications, one or more search services, or both to determine a second frequency at which each of the plurality of first words appear in searches for a definition of a respective word of the plurality of first words. The second frequency may represent a count of the number of times (Na) that users have searched for the word w or requested a definition of the word as discussed with respect to equation (1).

The frequency at which users have searched for a word may indicate the lexical difficulty of the word. Words that are searched for more often may have a higher lexical difficulty. However, an important consideration when utilizing the search frequency as a metric for determining the lexical difficulty of a word is that the frequency at which the word appears in the universe of textual data analyzed in operation 310. The SSR calculation shown in equation (1)

and discussed in the preceding examples considers the frequency at which the word appears to account when calculating the lexical difficulty. Thus, words that are searched more often relative to the number of times that the words appear in the universe may have a higher lexical difficulty than words that are searched less often relative to the number of times that the words appear in the universe.

The process 300 may include an operation 330 of generating a lexical difficulty model based on the first frequency and the second frequency of the plurality of first words, where the lexical difficulty model is configured to receive a word as an input and to output a prediction for how difficult a word is likely to be for a user. The lexical difficulty model may be a machine learning model trained using training data based on the first frequency and the second frequency of the plurality of first words or a statistical model generated based on the first frequency and the second frequency of the plurality of first words. The lexical difficulty of words may be determined using equations (1) or (2) discussed in the preceding examples. The model creation unit 235 may use the lexical difficulty information generated by the text analysis unit 230 to generate training data that may be used to train the lexical models 240, the personalized lexical models 245, and/or the domain-specific lexical models 225. The personalized lexical models 245 and/or the domain-specific lexical models 225 may be based on the lexical models 240, which may predict a lexical difficulty that a person may experience for certain words based on the crowdsourced data. However, people may have different language abilities. Some people may also have specialized knowledge of certain terminology based on their expertise with certain subject matter.

The text analysis unit 230 may also have access to and analyze private and/or semi-private data that may be used to produce a personalized lexical model 245 and/or a domain-specific lexical model for a particular user. The personalized lexical model 245 may be a machine learning model generated by further training a lexical model 240. The personalized lexical model 245 may be a statistical model that is generated based on the data used to generate the lexical model 240 and the private and/or semi-private data. For example, private documents, emails, messages, and/or other electronic content may be accessed to produce a personalized lexical model for a particular user. By analyzing content that has been read and/or authored by a particular user, the text analysis unit 230 may be able to more accurately assess the language abilities of the user and produce a lexical model that may more accurately predict whether the user may have difficulty with a particular word.

The process 300 may include an operation 340 of receiving a request to analyze first textual content from a client device. The native application 255 or the browser application 260 may request the first textual content be analyzed for lexical difficulty. In some implementations, the request may include the textual content to be analyzed. In other implementations, the request may include a URL or other reference to the textual content that indicates where the text analysis unit 230 may access the textual content to be analyzed.

The process 300 may include an operation 350 of analyzing the first textual content using the lexical difficulty model to generate lexical difficulty information for a plurality of second words included in the first textual content. The text analysis unit 230 may use the lexical model 240 to generate predictions of the lexical difficulty of words included in the textual content. In some implementations, the request may include a user identifier that identifies a user associated with the request. The user may be reading and/or authoring content in the native application 255 or the browser application 260. The request may include a user identifier that the text analysis service 110 may use to uniquely identify the user. The text analysis unit 230 may use this identifier to determine whether the user is associated with a personalized lexical model 245 and/or domain-specific lexical models 225. As discussed in the preceding examples, the text analysis unit 230 may maintain a database that maps user identifiers to identifiers of personalized lexical model 245 and/or domain-specific lexical models 225 associated with each user. If the user is associated with a personalized lexical model 245 and/or domain-specific lexical models 225, the text analysis unit 230 may utilize the personalized lexical model 245 or a domain-specific lexical model 225 for the user to analyze the first textual content.

The user may be associated with a personalized lexical model 245 and one or more domain-specific lexical models 225. The text analysis unit 230 may be configured to select the personalized lexical model 245 for analyzing the first textual content. In other implementations, the text analysis unit 230 may select one of the domain-specific lexical models 225 based on a subject matter of the first textual content. The text analysis unit 230 may be configured to analyze the first textual content using a machine learning model or statistical model configured to identify the subject matter of the first textual content. In other implementations, the text analysis unit 230 may be configured to analyze the first textual content using multiple models associated with the user, such as the personalized lexical model 245 and/or one or more domain-specific lexical models 225. The text analysis unit 230 may be configured to associate a lexical difficulty with words and/or phrases included in the first textual content and to provide definitions and/or other information for words that are considered to be lexically difficult by the selected models.

The process 300 may include an operation 360 of sending a response to the client device 105 that includes the lexical difficulty information for the plurality of second words included in the textual content. The text analysis unit 230 may provide a list of at least a portion of the words included in the textual content that was analyzed by the text analysis unit 230 and a lexical difficulty score for each of the words included in the list. In some implementations, the text analysis unit 230 may automatically lookup a definition for words having a lexical difficulty score that is higher than a threshold value and include those definitions with the response provided to the client device 105.

Figure 4:
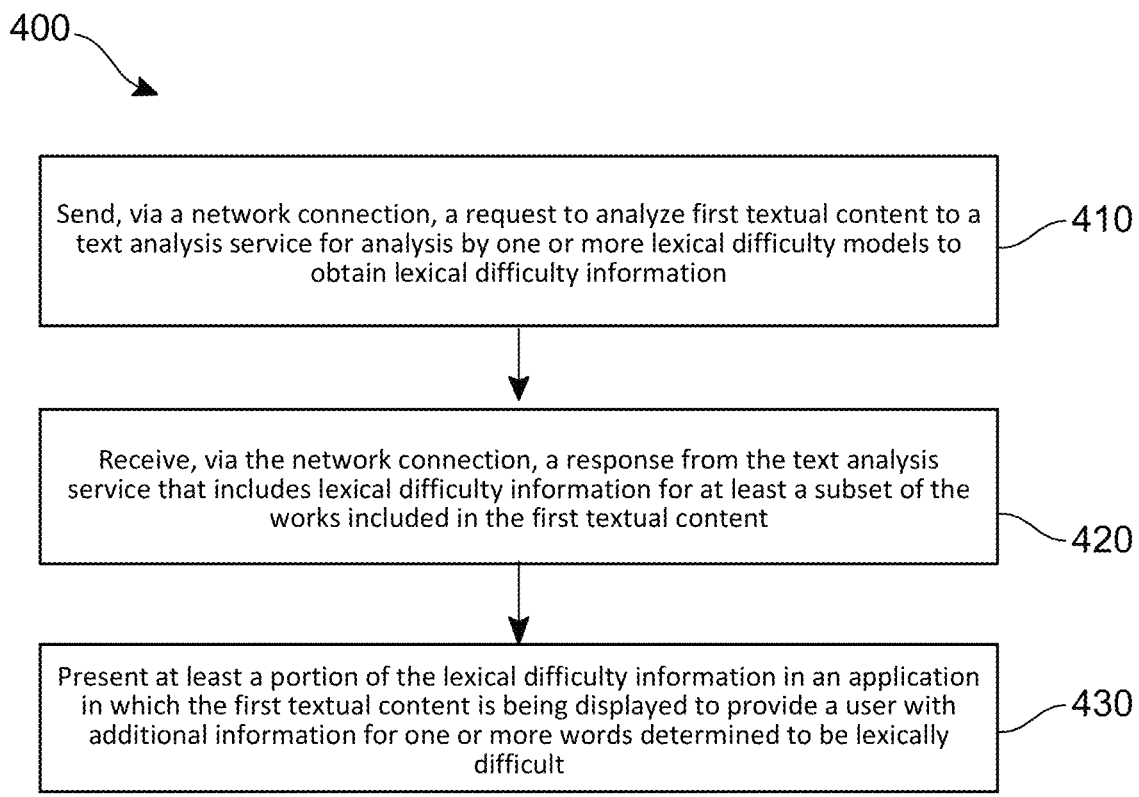
FIG. 4 is a flow chart of an example process for analyzing the lexical difficulty of words of textual content.

FIG. 4 is a flow chart of an example process 400 for analyzing the lexical difficulty of words of textual content. The process 400 may be implemented by the local text analysis unit 265 of the client device 105. The local text analysis unit 265 may communicate with the text analysis service 110 via the network 120 to send requests to analyze the lexical difficulty of words in the textual content and to receive lexical difficulty information for the words included in the textual content.

The process 400 may include an operation 410 of sending, via a network connection, a request to analyze first textual content to a text analysis service 110 for analysis by one or more lexical difficulty models to obtain lexical difficulty information. The first textual content may be a web page content, social media content, an electronic book and/or other electronic document, and/or other electronic content that the user may be reading, authoring, and/or modifying in the native application 255 or the browser application 260 of the client device 105. The request may include a portion of the textual content currently visible in a user interface of the native application 255 or the browser application 260 of the client device 105. The request may include a user identifier that may be mapped by the text analysis service 110 to a personalized lexical model 245 and/or one or more domain-specific lexical models 225. The request may indicate that the text analysis service 110 should use the personalized lexical model 245 and/or one or more domain-specific lexical models 225, if available, to analyze the first textual content.

The process 400 may include an operation 420 of receiving a response from the text analysis service 110 that includes lexical difficulty information for at least a subset of the works included in the first textual content. The response may include a list of at least a portion of the words included in the textual content that was analyzed by the text analysis service 110 and a lexical difficulty score for each of the words included in the list. The response may include a definition for words having a lexical difficulty score that is higher than a threshold value and include those definitions with the response provided to the client device 105.

The process 400 may include an operation 430 of presenting at least a portion of the lexical difficulty information in an application in which the first textual content is being displayed to provide a user with additional information for one or more words determined to be lexically difficult. As discussed in the preceding examples, the native application 255 or the browser application 260 may present the lexical difficulty information obtained from the text analysis service 110 in different ways. For example, the native application 255 or the browser application 260 may highlight, underline, and/or render some other indication over or proximate to the word to indicate that a word may be lexically difficulty for the user.

The process 400 may include an optional operation of receiving a user selection of a word indicated to have high lexical difficulty and displaying information for the word associated with the user selection. The user may provide a user input indicating that the user is requesting a definition for one or more words indicated to have a high lexical difficulty in the lexical difficulty information, and the native application 255 or the browser application 160 may render a user interface displaying the definition for the one or more words indicated to have a high lexical difficulty in the lexical difficulty information.

The user may click on, hover over a word with a pointer, touch the word on a touchscreen interface, or otherwise interact with the word to cause the native application 255 or the browser application 260 to display a definition and/or other information that may increase the user's understanding of the word. The user interface of the native application 255 and/or the browser application 260 may display an information pane that include a definition of the word, synonyms of the word, examples of usage of the word including sense information where the word is associated with multiple senses, and/or links to online resources that may further define the word and/or provide examples of the usage of the word. Other information in addition to or instead of the information discussed above may be provided. By displaying the information in an information pane within the native application 255 and/or the browser application 260, the user may be provided with relevant information that may improve the user's understanding of the lexically difficult word without having to leave the document, eBook, or other content with which the user was interacting.

The native application 255 and/or the browser application 260 may be configured to analyze user interactions with the data processing system indicative of a user requiring lexical assistance with the first textual content. For example, the native application 255 and/or the browser application 260 may determine that the user is looking up words included in the first textual content. The native application 255 and/or the browser application 260 may automatically obtain a definition and/or other information for the one or more words indicated to have the high lexical difficulty in the lexical difficulty information responsive to predicting that the user may benefit from detecting the user requiring assistance with the first textual content. The native application 255 and/or browser application 260 may implement a machine learning or statical model configured to recognize that a user may be having difficulty with one or more words included in the first textual content based on the user's interactions with the native application 255, the browser application 260, and/or the client device 105. The native application 255 and/or browser application 260 may search for the definitions and/or other information associated with the lexically difficult words and render a user interface in the application for displaying the definitions and/or other information. Some examples of such user interfaces are shown in FIGS. 7, 8, 9A, and 9B.

The detailed examples of systems, devices, and techniques described in connection with FIGS. 1-4 and 7-9B are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-4 and 7-9B are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 5:
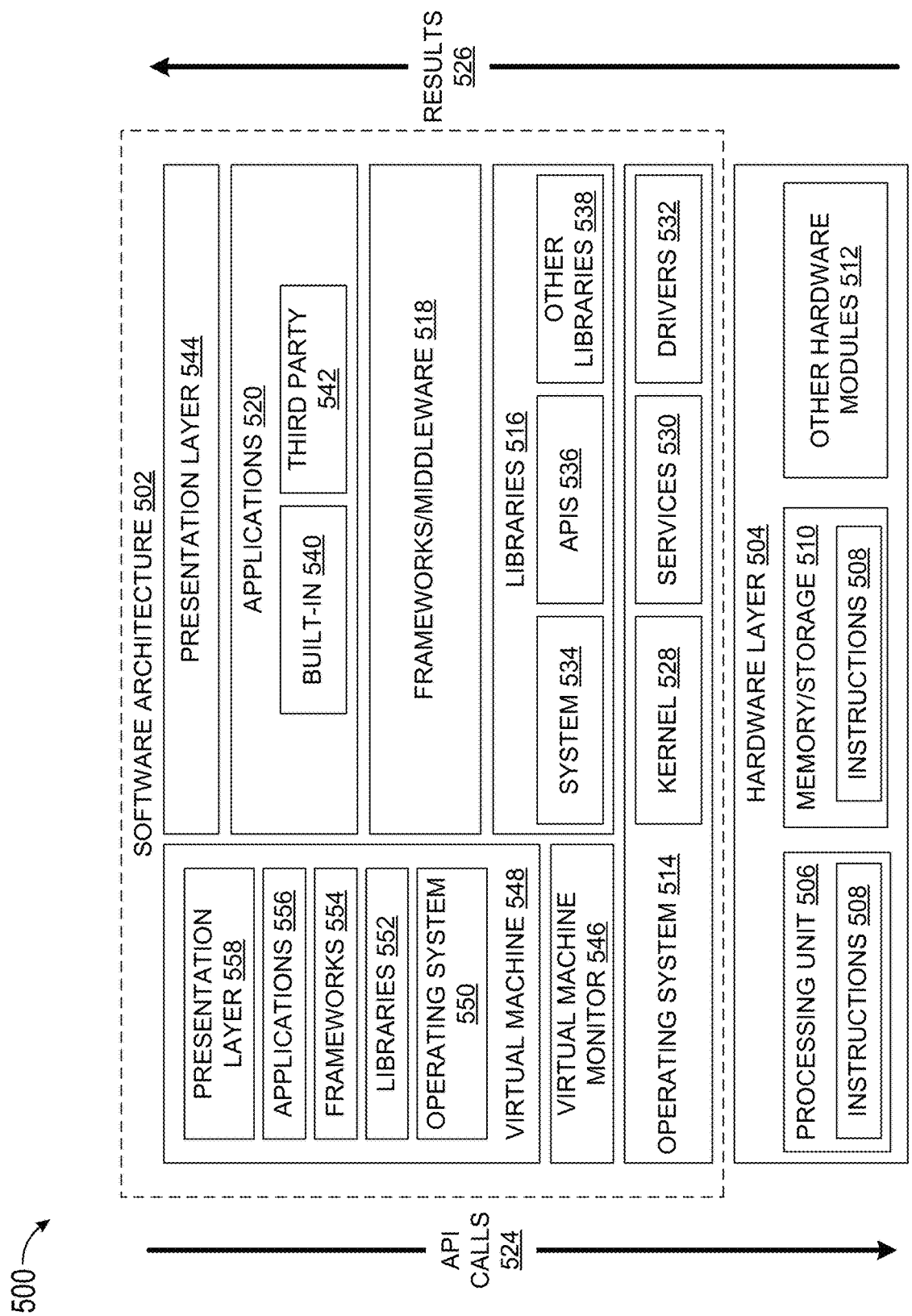
FIG. 5 is a block diagram illustrating an example software architecture, various portions of which may be used in conjunction with various hardware architectures herein described, which may implement any of the features herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as a machine 600 of FIG. 6 that includes, among other things, processors 610, memory 630, and input/output (I/O) components 650. A representative hardware layer 504 is illustrated and can represent, for example, the machine 600 of FIG. 6. The representative hardware layer 504 includes a processing unit 506 and associated executable instructions 508. The executable instructions 508 represent executable instructions of the software architecture 502, including implementation of the methods, modules and so forth described herein. The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL® library for rendering 2D and 3D graphics on a display), database libraries (for example, SQLite® or other relational database functions), and web libraries (for example, WebKit® that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular platform. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
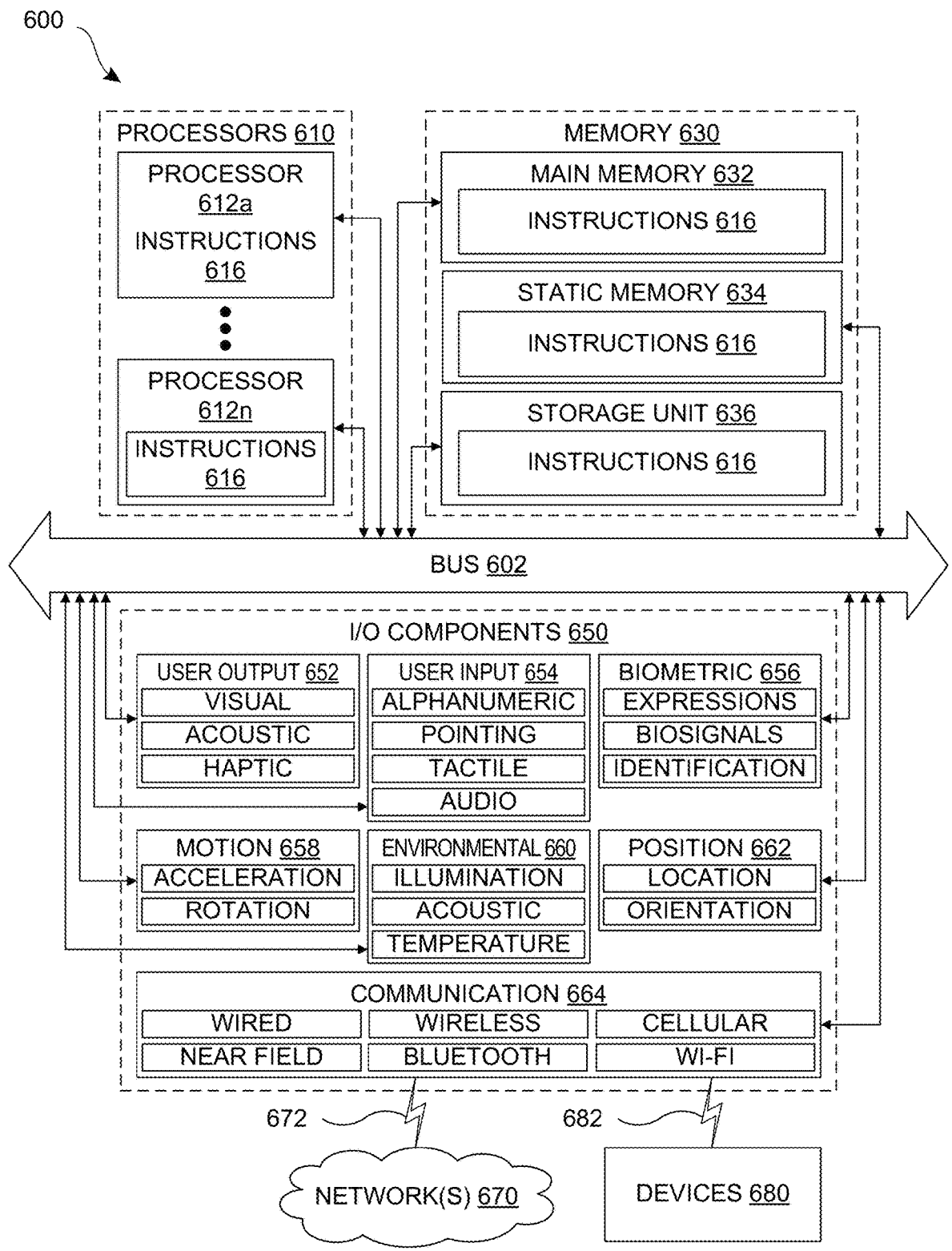
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement modules or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory of at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660, and/or position components 662, among a wide array of other physical sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 658 may include, for example, acceleration sensors (for example, an accelerometer) and rotation sensors (for example, a gyroscope). The environmental components 660 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 662 may include, for example, location sensors (for example, a Global Position System (GPS) receiver), altitude sensors (for example, an air pressure sensor from which altitude may be derived), and/or orientation sensors (for example, magnetometers).

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth® communication, Wi-Fi®, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a computer-readable medium storing executable instructions for causing the processor to perform operations comprising:
   analyzing a plurality of textual content sources to determine a first frequency at which a respective one of each of a plurality of first words appears in the plurality of textual content sources, wherein the plurality of textual content sources is obtained at least in part by automatically traversing a plurality of network-accessible content providers and collecting textual content provided by the plurality of network-accessible content providers;
   analyzing search data automatically collected by one or more applications, one or more search services, or both to determine a second frequency at which the respective one of each of the plurality of first words appear in searches for a definition of the respective word;
   determining a search-to-seen (SSR) ratio for the respective one of each of the plurality of first words by dividing the second frequency by the first frequency for the respective word;
   generating a lexical difficulty model based on a syntactic function of the respective word being an adjective or a noun and a weighted average of a plurality of factors associated with the respective one of each word of the plurality of first words, the plurality of factors including the SSR and a word sense count of the respective word, wherein an adjective is assigned with a higher lexical difficulty than a noun, and wherein the lexical difficulty model is configured to receive the respective word as an input and to output a prediction for how difficult the respective word is likely to be for a user;
   receiving a request to analyze first textual content from a client device of a first user, the request including user language proficiency information indicating that the first user has a specified level of language proficiency in a language of the first textual content;
   analyzing the first textual content using the lexical difficulty model to generate lexical difficulty information for each of a plurality of second words included in the first textual content, the lexical difficulty information including an indication that one or more words used in the first textual content are associated with a lexical difficulty that someone having the specified level of language proficiency would not find lexically difficult; and
   sending a response to the client device that includes the lexical difficulty information for the plurality of second words included in the textual content, the response further comprising an alternate word suggestion, the alternate word suggestion including a synonym of a word from the one or more words in the first textual content.

2. The data processing system of claim 1, wherein the plurality of factors further include at least one of the syntactic function of the respective word, a non-vowel length of the respective word, or a number of syllables of the respective word.

3. The data processing system of claim 2, wherein the lexical difficulty model is generated based on the weighted average including the syntactic function of the respective word.

4. The data processing system of claim 1, wherein the computer-readable medium includes instructions to cause the processor to perform operations of:
   generating a personalized lexical difficulty model for a user of the client device based only on network-accessible content authored by the user and collected at the client device,
   wherein the first textual content is analyzed using the personalized lexical difficulty model to generate lexical difficulty information for the plurality of second words included in the first textual content.

5. The data processing system of claim 4, wherein the computer-readable medium includes instructions to cause the processor to perform operations of:
   receiving user-specific word search and word usage data for the user; and
   updating training of the personalized lexical difficulty model for the user based on the user-specific word search and word usage data.

6. The data processing system of claim 1, wherein to generate the lexical difficulty model, the computer-readable medium includes instructions to cause the processor to perform operations of:
   analyzing domain-specific textual content sources comprising at least a subset of the plurality of textual content sources to determine a subject matter associated with each textual content source of the domain-specific textual content sources;
   grouping the domain-specific textual content sources into a plurality of domains based on the subject matter of the domain-specific textual content sources; and
   generating a first domain-specific lexical difficulty model based on the SSR and word usage in the domain-specific textual content sources associated with a first domain,
   wherein the domain is an enterprise or organization.

7. The data processing system of claim 1, wherein the computer-readable medium includes instructions to cause the processor to perform operations of:
   updating training of the lexical difficulty model based on lexical difficulty differences between adjectives and nouns in each of the plurality of textual content sources,
   wherein a textual content source among the plurality of textual content sources is an electronic document, an electronic presentation file, an email, a text message, a social media content, an electronic book, or a web page, and wherein the synonym has a lexical difficulty higher than the word from the first textual content.

8. A method implemented in a data processing system for analyzing lexical difficulty of words of textual content, the method comprising:

analyzing a plurality of textual content sources to determine a first frequency at which a respective one of each of a plurality of first words appears in the plurality of textual content sources, wherein the plurality of textual content sources is obtained at least in part by automatically traversing a plurality of network-accessible content providers and collecting textual content provided by the plurality of network-accessible content providers;

analyzing search data automatically collected by one or more applications, one or more search services, or both to determine a second frequency at which the respective one of each of the plurality of first words appear in searches for a definition of the respective word;

determining a search-to-seen (SSR) ratio for the respective one of each of the plurality of first words by dividing the second frequency by the first frequency for the respective word;

generating a lexical difficulty model based on a syntactic function of the respective word being an adjective or a noun and a weighted average of a plurality of factors associated with the respective one of each word of the plurality of first words, the plurality of factors including the SSR and a word sense count of the respective word, wherein an adjective is assigned with a higher lexical difficulty than a noun, and wherein the lexical difficulty model is configured to receive the respective word as an input and to output a prediction for how difficult the respective word is likely to be for a user;

receiving a request to analyze first textual content from a client device of a first user, the request including user language proficiency information indicating that the first user has a specified level of language proficiency in a language of the first textual content;

analyzing the first textual content using the lexical difficulty model to generate lexical difficulty information for each of a plurality of second words included in the first textual content, the lexical difficulty information including an indication that one or more words used in the first textual content are associated with a lexical difficulty that someone having the specified level of language proficiency would not find lexically difficult; and sending a response to the client device that includes the lexical difficulty information for the plurality of second words included in the textual content, the response further comprising an alternate word suggestion, the alternate word suggestion including a synonym of a word from the one or more words in the first textual content.

9. The method of claim 8, wherein the plurality of factors further include at least one of the syntactic function of the respective word, a non-vowel length of the respective word, or a number of syllables of the respective word.

10. The method of claim 9, wherein the lexical difficulty model is generated based on the weighted average including the syntactic function of the respective word.

11. The method of claim 8, wherein generating the lexical difficulty model further comprises:

generating a personalized lexical difficulty model for a user of the client device based only on network-accessible content authored by the user and collected at the client device, wherein the first textual content is analyzed using the personalized lexical difficulty model to generate lexical difficulty information for the plurality of second words included in the first textual content.

12. The method of claim 11, wherein generating the personalized lexical difficulty model for the user further comprises:

receiving user-specific word search and word usage data for the user; and updating training of the personalized lexical difficulty model for the user based on the user-specific word search and word usage data.

13. The method of claim 8, wherein generating the lexical difficulty model further comprises:

analyzing domain-specific textual content sources comprising at least a subset of the plurality of textual content sources to determine a subject matter associated with each textual content source of the domain-specific textual content sources;

grouping the domain-specific textual content sources into a plurality of domains based on the subject matter of the domain-specific textual content sources; and generating a first domain-specific lexical difficulty model based on the SSR and word usage in the domain-specific textual content sources associated with a first domain, wherein the domain is an enterprise or organization.

14. The method of claim 8, wherein the plurality of textual content sources includes an electronic document, an electronic presentation file, an email, a text message, or a web page.

15. A data processing system comprising:

a processor; and a computer-readable medium storing executable instructions for causing the processor to perform operations comprising:

analyzing, by a text analysis service, a plurality of textual content sources to determine a first frequency at which a respective one of each of a plurality of first words appears in a plurality of textual content sources, wherein the plurality of textual content sources is obtained at least in part by automatically traversing a plurality of network-accessible content providers and collecting textual content provided by the plurality of network-accessible content providers;

analyzing, by the text analysis service, search data automatically collected by one or more applications, one or more search services, or both to determine a second frequency at which the respective one of each of the plurality of first words appear in searches for a definition of the respective word;

determining, by the text analysis service, a search-to-seen (SSR) ratio for the respective one of each of the plurality of first words by dividing the second frequency by the first frequency for the respective word;

generating, by the text analysis service, a domain-specific lexical difficulty model based on a syntactic function of the respective word being an adjective or a noun and a weighted average of a plurality of factors associated with the respective one of each word of the plurality of first words, the plurality of factors including the SSR and a word sense count of the respective word, wherein an adjective is assigned with a higher lexical difficulty than a noun, and wherein the domain-specific lexical difficulty model is configured to receive the respective word as an input and to output a prediction for how difficult the respective word is likely to be for a user;

sending, from a first client device via a network connection, a request to analyze first textual content to the text analysis service for analysis to obtain lexical difficulty information, the request including a user identifier associated with a user of the first client device and the domain-specific lexical difficulty model, and user language proficiency information indicating that the user has a specified level of language proficiency in a language of the first textual content, the request indicating that the text analysis service should analyze the first textual content using the domain-specific lexical difficulty model, and the domain-specific lexical difficulty model being associated with an enterprise or organization;

receiving, at the first client device via the network connection, a response from the text analysis service that includes lexical difficulty information including an indication that one or more words used in the first textual content are associated with a lexical difficulty that someone having the specified level of language proficiency would not find lexically difficult, and an alternate word suggestion including a synonym of a word from the one or more words in the first textual content; and presenting, on a user interface of the first client device, at least a portion of the lexical difficulty information including the synonym in an application in which the first textual content is being displayed.

16. The data processing system of claim 15, wherein the user identifier is further associated with a personalized lexical data model, and wherein the request to analyze the first textual content indicates that the text analysis service should analyze the first textual content using the personalized lexical data model.

17. The data processing system of claim 15, wherein to present the at least a portion of the lexical difficulty information, the computer-readable medium includes instructions to cause the processor to perform operations of:

analyzing user interactions with the data processing system indicative of a user requiring lexical assistance with the first textual content;

obtaining a definition for the one or more words indicated to have a high lexical difficulty in the lexical difficulty information responsive to predicting that the user may benefit from detecting the user requiring assistance with the first textual content; and displaying on the user interface the definition for the one or more words indicated to have a high lexical difficulty in the lexical difficulty information.

18. The data processing system of claim 15, wherein to present the at least a portion of the lexical difficulty information, the computer-readable medium includes instructions to cause the processor to perform operations of:

receiving a user input requesting a definition for one or more words indicated to have a high lexical difficulty in the lexical difficulty information; and displaying on the user interface the definition for the one or more words indicated to have a high lexical difficulty in the lexical difficulty information, wherein the text analysis service resides on a second client device.

\* \* \* \* \*